S. Wilmarth,

Nail Extractor,

No. 1,540, Reissued Sept. 15, 1863.

Witnesses: J. W. Birkinbine, Saml. L. Hay.

Inventor: Seth Wilmarth.

AM. PHOTO-LITHO. CO. N.Y. (OSBORNE'S PROCESS)

UNITED STATES PATENT OFFICE.

SETH WILMARTH, OF CHARLESTOWN, MASSACHUSETTS.

IMPROVEMENT IN MACHINES FOR DRAWING BOLTS.

Specification forming part of Letters Patent No. 26,315, dated November 29, 1859; Reissue No. 1,540, dated September 15, 1863.

*To all whom it may concern:*

Be it known that I, SETH WILMARTH, of Charlestown, in the State of Massachusetts, have invented a new and useful Machine for Drawing Bolts; and I do hereby declare that the following is a full, clear, and exact description thereof, reference being had to the accompanying drawings, making a part of this specification, in which—

Figure 1:
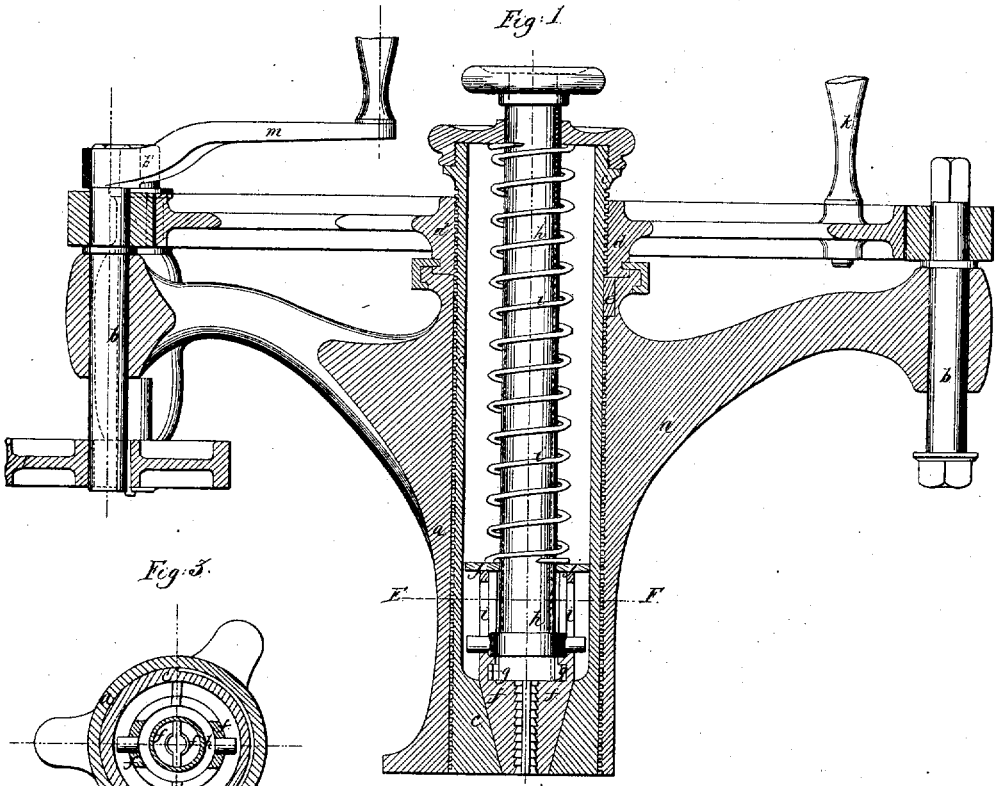
Figure 3:
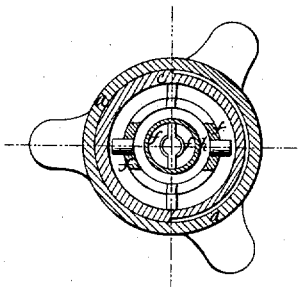
Figure 2:
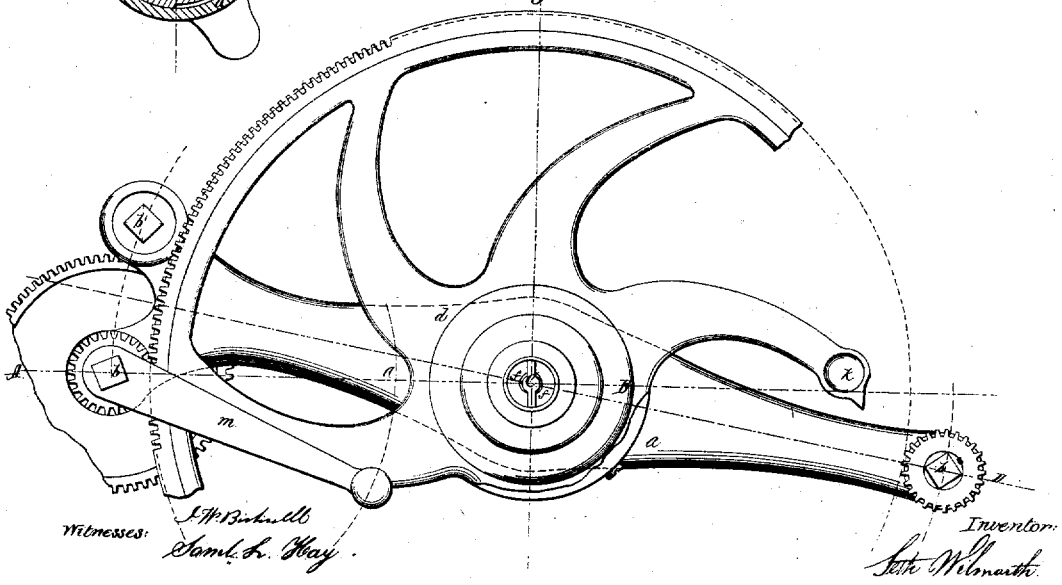

Figure 1 is a vertical section of the machine; Fig. 2, a part plan of the same, and Fig. 3, a horizontal section taken at the line E F of Fig. 1.

The same letters indicate like parts in all the figures.

My said invention is mainly designed for use in repairing ships and other vessels, and the purpose of it is to draw from their timbers or frames the bolts or fastenings by which the planking is secured to the timbers; but it is equally applicable to the drawing of bolts and similar articles from timber in general. It is well known that by the means employed for this purpose prior to my said invention the bolts were so bent and injured that they were unfit for further use, and as such bolts are expensive, particularly when made of copper, it is important to extract them without injury; and it is also well known that by the use of such means in drawing the bolts the timbers were frequently split and the holes left of an irregular form, which had to plugged up, thereby requiring extra labor and leaving the timber in an injured state. By my said invention the difficulties theretofore experienced are avoided, as the bolts are drawn by a force applied to them in the line of their axes, the grip by which they are held to be drawn being at all times proportioned to the force required to draw them, and as the bolts are drawn each by a succession of operations, each time taking a new grip on the bolts, the jaws and screw are so constructed as to permit the bolt to pass up between the jaws and through the screw, which is made hollow or tubular for the purpose.

In the accompanying drawings, *a* represents a stock or frame, which I prefer to make of metal and with a cylindrical bore extending through its entire length, the lower end of which stock is flat, to be placed and held against the face of the timber from which a bolt is to be drawn, and surrounding such bolt. To the cylindrical bore of this stock is fitted a hollow screw, *c*, so that it can slide therein without turning, a feather, *e*, secured to the stock and fitted to a longitudinal groove in the threaded surface, being a suitable means for this purpose, although other and equivalent means may be substituted to prevent it from turning. The periphery of this tube is threaded from end to end, and to this thread is fitted a nut, *d*, which is connected to the upper end of the stock *a* by a suitable collar, so as to admit of turning. This nut is the central hub of a power-wheel, so that by turning the wheel and nut the hollow screw *c* will be drawn up or let down. The wheel *d* is provided with a handle, *k*, by which it can be turned; but when more power is required, the periphery of the wheel *d* is cogged to be engaged by suitable gearing to multiply the power, the stock *a* being provided with arms to form the bearings for the shafts *b b* of such power-multiplying gearing.

The bolt to be drawn is gripped by jaws *f f*, which I prefer to make in segments, and the gripping-surfaces are serrated to form gripping-teeth, as represented. A curved spring, *g*, is placed in a recess inside the jaws and above their gripping-surfaces, the tension of which spring tends to open the jaws when the closing power is suspended, that they may embrace that part of the bolt which projects from the timber. By means of an inner tube, *h*, termed the "ram," the jaws are forced down to take their grip, or drawn up, when desired, this ram or tube being provided with projections near the lower end, fitted to vertical slots *l l*, in the upper part of the jaws, so that by drawing up or down the said ram *h* the jaws will be lifted or let down. On top of the jaws and surrounding the tubular ram *h* there is a washer, *j*, which is held down by the tension of a spiral spring, *i*. This spring surrounds the tubular ram *h*, and it is confined by a cap on the upper end of the tubular screw *c*, through which the upper end of the ram passes. The outer surface of the gripping-jaws is in the form of the frustum of a cone, the smallest end at the extremity of the jaws, and the lower end of the bore of the hollow screw *c* is of the reversed form, to fit the conical outer surface of the jaws. The stock having been placed with its lower end against the timber, and so as to surround the projecting part of the bolt to be drawn, and the hollow screw *c* let down so that its extreme end touches the timber, the jaws, having been held back by the ram and held open by the spring *g*, are now forced down by the ram *h*, aided by the tension of the spiral spring *i*, and as they are forced down their outer conical surface comes into contact with the inner conical surface of the hollow screw *c*, which, wedge-like, forces them to grip the projecting part of the bolt. Then, by turning the wheel and nut *d*, the screw *c* is drawn up and acts by its conical inner surface against the conical outer surface of the jaws to draw them up, and by thus acting on the jaws by a wedge-like action causes the grip of the jaws on the bolt to be at all times proportioned to the power required to draw out the bolt. The bolt in this manner is drawn, and if it be too long to draw it entirely out at one operation, the wheel and nut *d* is turned in the opposite direction to let down the hollow screw *c*. This liberates the jaws, which are again forced down by the ram to take another hold. In this way the operation is repeated until the bolt is entirely drawn out, the bolt at each renewed operation passing up through the hollow ram.

It will be obvious from the foregoing that the ram may be dispensed with, as it performs no office in the operation of drawing bolts, and acts merely as an auxiliary to aid in forcing the jaws down to take hold of a bolt.

The screw made hollow for the passage of the bolt through it and operated by the nut, which screw by its wedge-like action on the jaws, which, like the screw, admit of the passage of the bolt, causes them to grip the bolt and draw them so that the force of the grip shall be proportioned to the force required to draw out the bolt, constitutes the leading feature of my invention.

What I claim as my invention, and desire to secure by Letters Patent, is—

1. The combination of the stock or frame to form a rest against the timber from which a spike is to be drawn, the gripping-jaws to take hold of the bolt, the rotating nut, and the hollow lifting-screw, for drawing the jaws by a wedge-like action, so that the force applied to draw the bolt shall act upon the jaws and cause them to grasp the bolt by a force corresponding to the force required to draw it, the screw being tubular or hollow and the jaws being so constructed as to permit the bolt to pass through them, substantially as herein described.

2. The hollow ram, in combination with the stock, the lifting-screw, and the gripping-jaws, substantially as and for the purpose specified.

Witnesses: SETH WILMARTH.
ISAAC HULL WRIGHT,
LEWIS LATIMER.